United States Patent
Choi

(10) Patent No.: US 10,160,415 B2
(45) Date of Patent: Dec. 25, 2018

(54) HINGE DEVICE FOR AIRBAG DOOR OF VEHICLE

(71) Applicants: Hyundai Motor Company, Seoul (KR); Kia Motors Corporation, Seoul (KR)

(72) Inventor: Sung Sik Choi, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 80 days.

(21) Appl. No.: 15/376,421

(22) Filed: Dec. 12, 2016

(65) Prior Publication Data

US 2018/0099633 A1    Apr. 12, 2018

(30) Foreign Application Priority Data

Oct. 6, 2016 (KR) .................... 10-2016-0128792

(51) Int. Cl.
*B60R 21/215* (2011.01)
*B60R 21/216* (2011.01)

(52) U.S. Cl.
CPC .......... *B60R 21/216* (2013.01); *B60R 21/215* (2013.01); *B60R 2021/2163* (2013.01); *B60R 2021/21537* (2013.01)

(58) Field of Classification Search
CPC ........................................... B60R 2021/21537
See application file for complete search history.

(56) References Cited

U.S. PATENT DOCUMENTS

| | | | | |
|---|---|---|---|---|
| 5,202,173 A * | 4/1993 | Wu | ........................ | A61F 13/494 264/288.8 |
| 5,472,769 A * | 12/1995 | Goerz, Jr. | ................. | B32B 5/26 428/138 |
| 6,440,564 B1 * | 8/2002 | McLain | ..................... | B31F 1/07 428/409 |
| 6,737,371 B1 * | 5/2004 | Planck | ................... | A61F 2/0063 428/373 |
| 7,878,528 B2 * | 2/2011 | Dorn | ...................... | B60R 21/216 280/728.3 |
| 7,967,330 B2 * | 6/2011 | Kong | ................... | B29C 45/0081 280/728.3 |
| 8,070,903 B1 * | 12/2011 | Meschter | ................ | B29C 43/22 156/242 |
| 8,096,577 B2 * | 1/2012 | Roring | ................... | B60R 21/215 16/221 |
| 8,348,303 B1 * | 1/2013 | Roring | ................... | B60R 21/215 280/728.3 |

(Continued)

FOREIGN PATENT DOCUMENTS

| | | | | |
|---|---|---|---|---|
| DE | 102005003550 A1 * | 8/2006 | ......... | B60R 21/2165 |
| DE | 102007053996 A1 * | 5/2009 | ........... | B60R 21/205 |

(Continued)

*Primary Examiner* — Nicole T Verley
(74) *Attorney, Agent, or Firm* — Slater Matsil, LLP

(57) ABSTRACT

A hinge device for an airbag door of a vehicle is provided. In particular embodiments, a fabric sheet is made by weaving warp yarns and weft yarns with a plurality of grid spaces and integrally formed on an inner surface of an airbag door. Grid spaces formed in opposite ends of the fabric sheet that are rotated when the airbag door is opened by deployment of an airbag are arranged in a state of being compressed so as to be extensible.

10 Claims, 3 Drawing Sheets

(56) References Cited

U.S. PATENT DOCUMENTS

| | | | | |
|---|---|---|---|---|
| 8,403,357 | B2* | 3/2013 | Choi | B60R 21/215 |
| | | | | 280/728.2 |
| 8,657,327 | B2* | 2/2014 | Kanno | B29C 65/06 |
| | | | | 180/90 |
| 9,010,801 | B2* | 4/2015 | Baudart | B60R 13/0256 |
| | | | | 280/728.3 |
| 9,669,791 | B2* | 6/2017 | Svensson | B29C 45/14631 |
| 2007/0243356 | A1* | 10/2007 | Baer | B32B 3/02 |
| | | | | 428/99 |
| 2008/0148680 | A1* | 6/2008 | Jaenson | B21F 27/02 |
| | | | | 52/660 |
| 2009/0235813 | A1* | 9/2009 | Cashin | B32B 5/26 |
| | | | | 89/36.02 |
| 2014/0077479 | A1 | 3/2014 | Kim et al. | |
| 2014/0120285 | A1* | 5/2014 | Hoeing | B60R 21/215 |
| | | | | 428/36.1 |
| 2014/0265261 | A1* | 9/2014 | Surdu | B60R 21/20 |
| | | | | 280/728.2 |
| 2015/0266260 | A1* | 9/2015 | Fujioka | B32B 3/30 |
| | | | | 428/118 |
| 2015/0274112 | A1* | 10/2015 | Yokota | B60K 37/00 |
| | | | | 280/728.3 |
| 2015/0298406 | A1* | 10/2015 | Costin | B63B 35/7913 |
| | | | | 428/12 |
| 2016/0023625 | A1* | 1/2016 | Roring | B60R 21/215 |
| | | | | 280/728.3 |

FOREIGN PATENT DOCUMENTS

| | | | | |
|---|---|---|---|---|
| DE | 102008019950 | A1 * | 10/2009 | ........... B60R 21/215 |
| DE | 102010040708 | A1 * | 3/2012 | ....... B29C 45/14418 |
| DE | 102014010038 | A1 * | 8/2015 | ........... B60R 21/215 |
| EP | 2439112 | A1 * | 4/2012 | ........... B60R 21/215 |
| FR | 2855806 | A1 * | 12/2004 | ........... B60R 21/215 |
| FR | 3013011 | A1 * | 5/2015 | ........... B60R 21/205 |
| JP | H06344852 | A | 12/1994 | |
| JP | 2008049759 | A | 3/2008 | |
| KR | 20140037708 | A | 3/2014 | |

* cited by examiner

HINGE DEVICE FOR AIRBAG DOOR OF VEHICLE

CROSS-REFERENCE TO RELATED APPLICATIONS

This application claims under 35 U.S.C. § 119(a) the benefit of priority to Korean Patent Application No. 10-2016-0128792, filed on Oct. 6, 2016, the entire contents of which are incorporated herein by reference.

TECHNICAL FIELD

The present disclosure relates to a hinge device for an airbag door of a vehicle.

BACKGROUND

Generally, airbag modules for vehicles include an airbag module for a driver's seat that is installed in a steering wheel, and an airbag module for a passenger seat that is installed in an instrument panel ahead of the passenger seat.

Typically, taking the appearance into account, the airbag modules are installed to be covered with airbag doors. A cutting line such as a line groove is formed in an inner or outer surface of such an airbag door.

Thus, when an airbag of the airbag module is deployed, the airbag door is torn along the cutting line and is opened in both directions.

However, there is a problem in that, when the airbag door is torn and opened, fragments or the like are scattered from portions of the airbag door that are adjacent to the cutting line and may inflict an injury on a user.

Furthermore, because a separate hinge structure is not used on a rotation center point of the airbag door, the airbag door may not be smoothly rotated or opened outward. If the airbag door is not completely opened, the deployment of the airbag may be impeded by the airbag door.

In an effort to overcome the above-mentioned problems, a structure in which a fabric sheet formed by weaving warp yarns and weft yarns is attached to an inner surface of an airbag door to control deployment of an airbag door in multi-steps was proposed in U.S. Pat. No. 8,348,303 ("303 patent").

In more detail, the fabric sheet introduced in the '303 patent is formed by alternately arranging stop warp yarns for supporting a load and base warp yarns parallel with each other in a direction in which force is applied when the airbag explodes, and weaving weft yarns with the warp yarns in a grid shape. The stop warp yarns for supporting the load are longer than the base warp yarns.

In this regard, opposite ends of the stop warp yarns for supporting the load overlap with each other in a zigzag form and thus function as hinges of the airbag door.

That is, when the airbag door opens, the base warp yarns are snapped, but the longer stop warp yarns for support the load function as hinges for rotation of the airbag door without being snapped.

However, in the configuration of the fabric sheet introduced in the '303 patent, the stop warp yarns for supporting the load may be snapped by the pressure of explosion of the airbag. If the stop warp yarns are snapped, they cannot function as the hinges of the airbag door, whereby the airbag door may be separated from the original position thereof and scattered outward.

The above information disclosed in this Background section is only for enhancement of understanding of the background of the invention and therefore it may contain information that does not form the prior art that is already known in this country to a person of ordinary skill in the art.

SUMMARY

The present disclosure relates to a hinge device for an airbag door of a vehicle. Particular embodiments relate to a hinge device for an airbag door of a vehicle which is formed in such a way that a fabric sheet woven in a grid shape is integrally formed on an inner surface of the airbag door, so that when the airbag door opens, the fabric sheet functions as a hinge of the airbag door.

Embodiments of the present invention is to provide a hinge device for an airbag door of a vehicle which is formed in such a way that a fabric sheet formed by weaving warp yarns and weft yarns with grid spaces (for example, rhombus-shaped spaces) is integrally formed on an inner surface of the airbag door by an insert injection molding method, so that the airbag door can be prevented from being scattered when the airbag is deployed and the fabric sheet can also reliably function as a hinge of the airbag door.

In one aspect, the present invention provides a hinge device for an airbag door of a vehicle. The hinge device includes a fabric sheet made by weaving warp yarns and weft yarns with a plurality of grid spaces and integrally formed on an inner surface of the airbag door. Grid spaces formed in opposite ends of the fabric sheet that are rotated when the airbag door is opened by deployment of an airbag are arranged in a state of being compressed so as to be extensible.

In a preferred embodiment, the fabric sheet may be integrally formed on the inner surface of the airbag door by an insert injection molding method.

In another preferred embodiment, the grid spaces may include first rhombus-shaped grid spaces arranged in a fixed state in a central region of the fabric sheet, and second rhombus-shaped grid spaces arranged in a state of being compressed so as to be extensible in the opposite ends of the fabric sheet.

In still another preferred embodiment, a left-right diagonal line of each of the second grid spaces is perpendicular to a direction in which force is applied when the airbag is deployed, and is longer than a left-right diagonal line of each of the first grid spaces, and an up-down diagonal line of the second grid spaces is parallel with the direction in which the force is applied when the airbag is deployed, and is shorter than an up-down diagonal line of the first grid spaces.

In yet another preferred embodiment, each of the first grid spaces may be formed in a form of a rhombus having a symmetry angle ranging from 30° to 60° based on a direction in which force is applied when the airbag is deployed.

In still yet another preferred embodiment, each of the second grid spaces may be formed in a form of a rhombus having a symmetry angle ranging from 60° to 90° based on a direction in which force is applied when the airbag is deployed.

In a further preferred embodiment, the second grid spaces may be formed such that, before the airbag is deployed, the up-down diagonal line of each of the second grid spaces is maintained to be shorter than the left-right diagonal line thereof, and after the airbag is deployed, the up-down diagonal line of the second grid spaces extends to be longer than the left-right diagonal line thereof.

In another aspect, the present invention provides a method of making a hinge device for an airbag door of a vehicle. A fixed fabric sheet is formed by weaving warp yarns and weft yarns with a plurality of grid spaces and integrally formed on an inner surface of an airbag door. Grid spaces formed in opposite ends of the fabric sheet that are rotated when the airbag door is opened by deployment of an airbag are arranged in a state of being compressed so as to be extensible.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
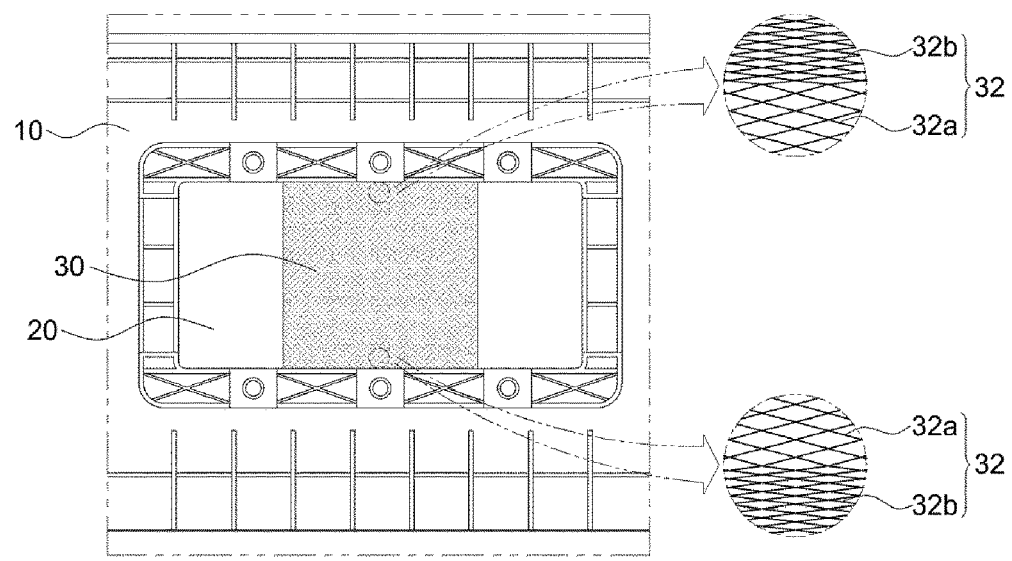
FIG. 1 is a rear view illustrating a hinge device for an airbag door of a vehicle according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Further, in the following detailed description, names of constituents, which are in the same relationship, are divided into "the first", "the second", etc., but the present invention is not necessarily limited to the order in the following description.

Hereinafter, an embodiment of the present invention will be described in detail with reference to the accompanying drawings.

Figure 2:
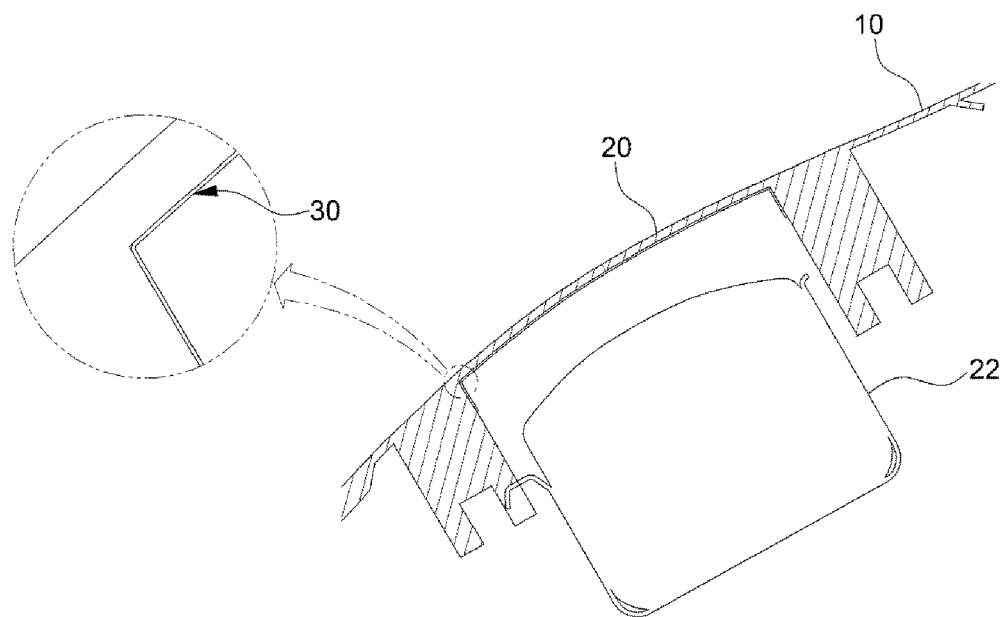
FIGS. 2 and 3 are sectional views illustrating the hinge device for the airbag door of the vehicle according to the present invention.

FIG. 1 is a rear view illustrating a hinge device for an airbag door of a vehicle according to the present invention, and shows a fabric sheet formed on an inner surface of the airbag door by an insert injection molding. FIG. 2 is a sectional view illustrating the hinge device for the airbag door of the vehicle according to the present invention, and shows the state of the airbag before it is deployed.

In FIG. 1, reference numeral 10 denotes an instrument panel, and reference numeral 20 denotes an airbag door.

The instrument panel 10 is a panel disposed ahead of a passenger seat. A globe compartment or the like is installed in a lower part of the instrument panel 10, and an airbag module 22 for a passenger seat is installed in an upper part of the instrument panel 10.

The airbag module 22 is installed such that it is covered with the airbag door 20. A cutting line (not shown) having a line groove shape is formed in an inner or outer surface of the airbag door 20 such that the cutting line is cut when the airbag is deployed.

According to the present invention, the fabric sheet 30 is made by weaving warp yarns and weft yarns such that a plurality grid spaces 32 is formed, and the woven fabric sheet 30 is integrally formed on the inner surface of the airbag door 20. Each grid space 32 is formed in a rhombus shape.

Preferably, each of the opposite ends of the fabric sheet 30 is a portion on which the airbag door 20 is rotated, that is, a portion functioning as a hinge of the airbag door 20, when the airbag door 20 opens. The grid spaces 32 in the opposite ends of the fabric sheet 30 are arranged in a state in which they are compressed so as to be extensible.

In detail, the grid spaces 32 formed in the fabric sheet 30 include first rhombus-shaped grid spaces 32a which are distributed in a central region of the fabric sheet 30, and second rhombus-shaped grid spaces 32b which are arranged in the opposite ends of the fabric sheet 30 in a state in which they are compressed so as to be extensible.

Figure 4:
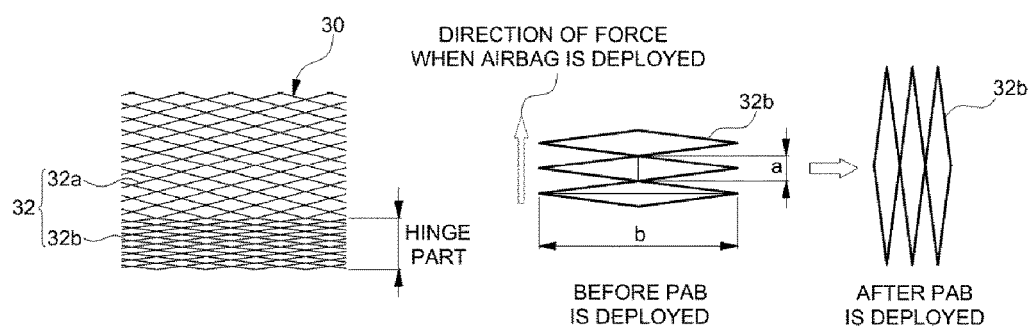
FIG. 4 illustrates a fabric sheet according to the present invention, and is a partial enlarged view illustrating an example in which opposite ends of the fabric sheet are changed in shape when the airbag is deployed.

In this regard, the words "the second grid spaces 32b of the fabric sheet 30 are arranged in the opposite ends of the fabric sheet 30 in a state in which they are compressed so as to be extensible" mean that, as shown in FIG. 4, a left-right diagonal line b of each second grid space 32b that is perpendicular to a direction in which force is applied when the airbag is deployed is longer than a left-right diagonal line of each first grid space 32a, and an up-down diagonal line a of the second grid space 32b that is parallel with the direction in which the force is applied when the airbag is deployed is shorter than an up-down diagonal line of the first grid space 32a.

Figure 5:
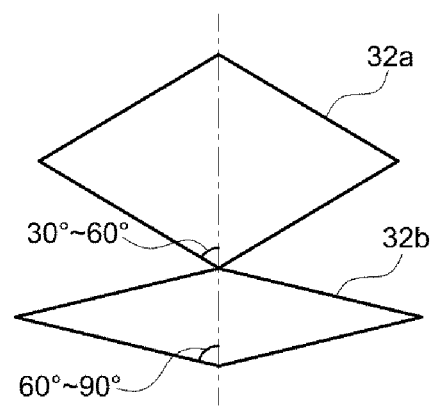
FIG. 5 is a partial enlarged view comparing in size between a first grid space and a second grid space of the fabric sheet according to the present invention.

Referring to FIG. 5, the first grid space 32a is formed in the form of a rhombus having a symmetry angle ranging 30° to 60° based on the direction in which force is applied when the airbag is deployed. The second grid space 32b is formed in the form of a rhombus having a symmetry angle ranging 60° to 90° based on the direction in which force is applied when the airbag is deployed. As such, the second grid spaces 32b of the fabric sheet 30 can be arranged in the state in which they are compressed so as to be extensible compared to the first grid spaces 32a.

When the fabric sheet 30 is integrally formed on the inner surface of the airbag door 20 by an insert injection molding method, it is preferable that only the portion of the fabric sheet 30 in which the first grid spaces 32a may be formed is integrally formed on the inner surface of the airbag door 20, and the opposite ends of the fabric sheet 30, that is, the portions of the fabric sheet 30 in which the second grid spaces 32b are formed, may remain to be separated from the inner surface of the airbag door so that each of the opposite ends of the fabric sheet 30 can function as a hinge.

The operation flow of the hinge device of the airbag door according to the present invention will be described below.

Figure 3:
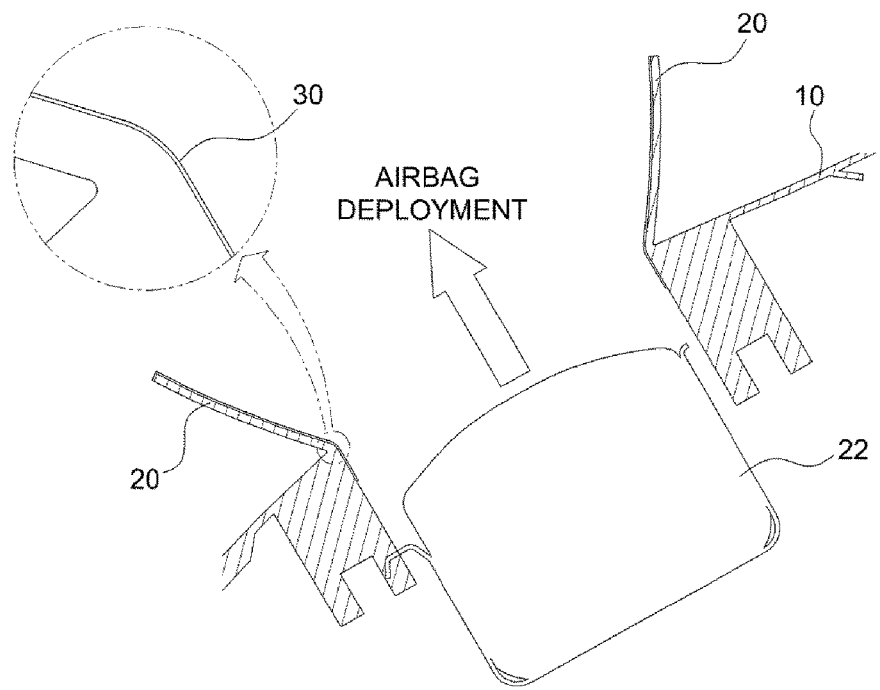

When a vehicle collision or the like occurs, the airbag module 22 is operated and the airbag is deployed. In this case, as shown in FIG. 3, the airbag door 20 is torn along the cutting line and is opened in both directions.

When the airbag door 20 opens, the opposite ends of the fabric sheet 30, that is, the portions of the fabric sheet 30 in which the second grid spaces 32b are formed, function as hinges of the airbag door 20.

In more detail, as shown in FIG. 4, before the airbag is deployed, the up-down diagonal line a of each second grid space 32b is maintained to be shorter than the left-right diagonal line b thereof. After the airbag is deployed, the up-down diagonal line a of each second grid space 32b extends to be longer than the left-right diagonal line b thereof. Consequently, the portions of the fabric sheet 30 in which the second grid spaces 32b are formed can reliably function as the hinges of the airbag door.

Because the portion of the fabric sheet 30 in which the first grid spaces 32a are formed is integrally formed on the inner surface of the airbag door 20 by injection molding, the deployment load of the airbag can be dispersed to the left and right and, simultaneously, the portions of the fabric sheet 30 in which the second grid spaces 32b are formed are extended by the force generated when the airbag is deployed. Therefore, the portions of the fabric sheet 30 in which the second grid spaces 32b are formed can reliably function as the hinges for rotating the airbag door.

Furthermore, the fabric sheet 30 functions to tightly hold the inner surface of the airbag door 20, thus preventing fragments or the like from being generated from the airbag door when it is torn by the pressure of explosion of the airbag. In addition, even if fragments are generated, the fragments are caught by the fabric sheet 30 so that they can be prevented from being scattered to the outside.

As described above, the present invention has the following effects.

First, a fabric sheet is integrally formed on an inner surface of an airbag door, and a portion of the fabric sheet in which first grid spaces (distributed on a central region of the fabric sheet) are formed can disperse a deployment load of the airbag to the left and right. Portions of the fabric sheet in which second grid spaces (distributed on opposite ends of the fabric sheet) are formed are extended by force generated when the airbag is deployed, and thus are able to reliably function as hinges for rotation of the airbag door.

Second, because the fabric sheet functions to tightly hold the inner surface of the airbag door, fragments or the like of the airbag door can be prevented from being scattered when the airbag is deployed.

Third, warp yarns and weft yarns of the fabric sheet that is used as the hinge of the airbag door according to the present invention can reliably function as the hinge despite having tensile strength which is lowered by approximately ¼ to ½ of that of the warp yarns that are used as the hinge for the conventional airbag door.

Fourth, the fabric sheet that is used as the hinge of the airbag door according to the present invention employs warp yarns and weft yarns which have low tensile strength and are inexpensive. Therefore, compared to the conventional fabric sheet that employs expensive stop warp yarns for supporting a load, the production cost of the fabric sheet can be reduced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hinge device for an airbag door of a vehicle, the hinge device comprising:
    a fabric sheet made by weaving warp yarns and weft yarns with a plurality of grid spaces and integrally formed on an inner surface of an airbag door, wherein grid spaces formed in opposite ends of the fabric sheet that are rotated when the airbag door is opened by deployment of an airbag are arranged in a state of being compressed so as to be extensible;
    wherein the grid spaces comprise first rhombus-shaped grid spaces arranged in a fixed state in a central region of the fabric sheet, and second rhombus-shaped grid spaces arranged in a state of being compressed so as to be extensible in opposite ends of the fabric sheet; and
    wherein a left-right diagonal line of each of the second grid spaces is perpendicular to a direction in which force is applied when the airbag is deployed, and is longer than a left-right diagonal line of each of the first grid spaces, and an up-down diagonal line of the second grid spaces is parallel with a direction in which force is applied when the airbag is deployed, and is shorter than an up-down diagonal line of the first grid spaces.

2. The hinge device of claim 1, wherein the fabric sheet is integrally formed on the inner surface of the airbag door by an insert injection molding method.

3. The hinge device of claim 1, wherein each of the first grid spaces is formed in a form of a rhombus having a symmetry angle ranging from 30° to 60° based on a direction in which force is applied when the airbag is deployed.

4. The hinge device of claim 1, wherein each of the second grid spaces is formed in a form of a rhombus having a symmetry angle ranging from 60° to 90° based on a direction in which force is applied when the airbag is deployed.

5. The hinge device of claim 1, wherein the second grid spaces are formed such that, before the airbag is deployed, an up-down diagonal line of each of the second grid spaces is maintained to be shorter than an left-right diagonal line thereof, and after the airbag is deployed, the up-down diagonal line of the second grid spaces extends to be longer than the left-right diagonal line thereof.

6. A method of making a hinge device for an airbag door of a vehicle, the method comprising:
    forming a fabric sheet by weaving warp yarns and weft yarns with a plurality of grid spaces and integrally formed on an inner surface of an airbag door, wherein grid spaces formed in opposite ends of the fabric sheet that are rotated when the airbag door is opened by deployment of an airbag are arranged in a state of being compressed so as to be extensible;
    wherein the grid spaces comprise first rhombus-shaped grid spaces arranged in a fixed state in a central region of the fabric sheet, and second rhombus-shaped grid spaces arranged in a state of being compressed so as to be extensible in opposite ends of the fabric sheet; and wherein a left-right diagonal line of each of the second grid spaces is perpendicular to a direction in which force is applied when the airbag is deployed, and is longer than a left-right diagonal line of each of the first grid spaces, and an up-down diagonal line of the second grid spaces is parallel with a direction in which force is applied when the airbag is deployed, and is shorter than an up-down diagonal line of the first grid spaces.

7. The method of claim 6, wherein the fabric sheet is integrally formed on the inner surface of the airbag door by an insert injection molding method.

8. The method of claim 6, wherein each of the first grid spaces is formed in a form of a rhombus having a symmetry angle ranging from 30° to 60° based on a direction in which force is applied when the airbag is deployed.

9. The method of claim 6, wherein each of the second grid spaces is formed in a form of a rhombus having a symmetry angle ranging from 60° to 90° based on a direction in which force is applied when the airbag is deployed.

10. The method of claim 6, wherein the second grid spaces are formed such that, before the airbag is deployed, an up-down diagonal line of each of the second grid spaces is maintained to be shorter than an left-right diagonal line thereof, and after the airbag is deployed, the up-down diagonal line of the second grid spaces extends to be longer than the left-right diagonal line thereof.

\* \* \* \* \*